(No Model.) 2 Sheets—Sheet 1.

J. G. SMITH.
MILK COOLER.

No. 293,805. Patented Feb. 19, 1884.

Witnesses
L. C. Hills
W. B. Masson

Inventor
Julius G. Smith
by E. E. Masson
atty.

(No Model.) 2 Sheets—Sheet 2.
J. G. SMITH.
MILK COOLER.
No. 293,805. Patented Feb. 19, 1884.
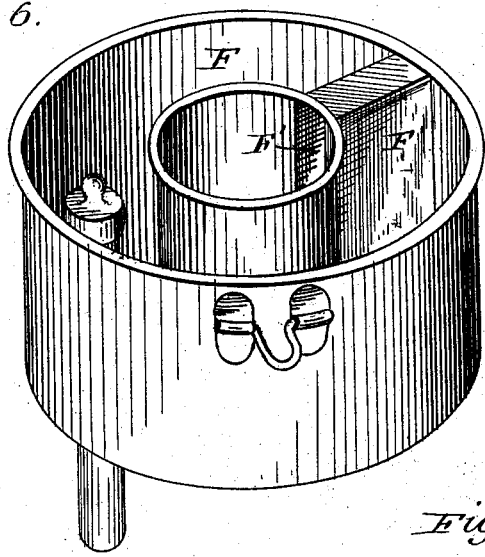
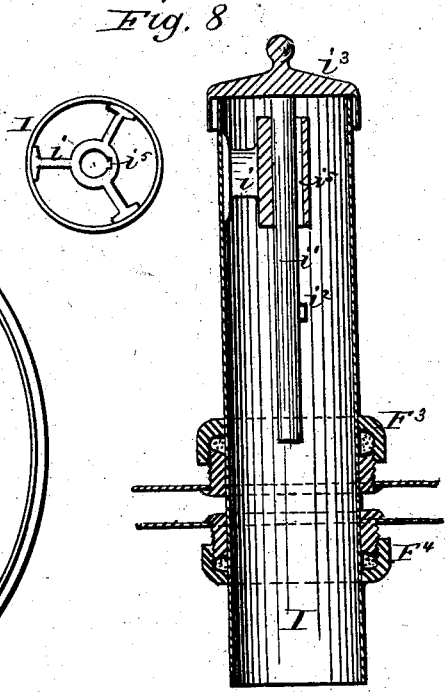
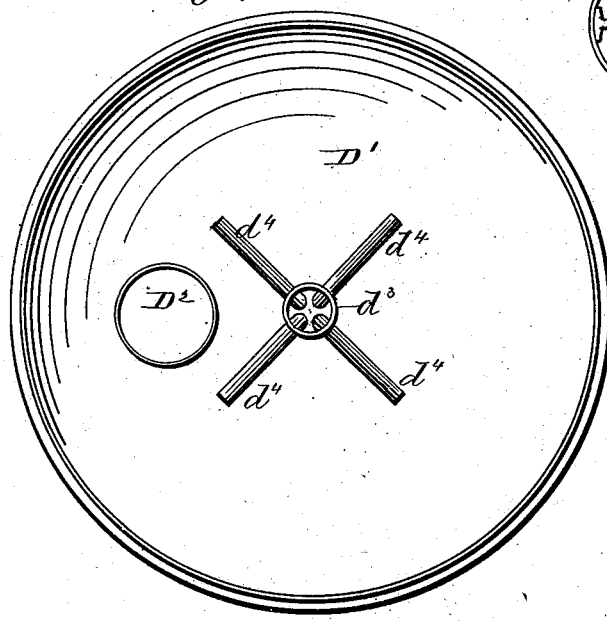
Witnesses:
L. C. Hills
W. B. Masson
Inventor
Julius G. Smith,
by E. E. Masson
atty.

UNITED STATES PATENT OFFICE.

JULIUS G. SMITH, OF MARGARETVILLE, NEW YORK.

MILK-COOLER.

SPECIFICATION forming part of Letters Patent No. 293,805, dated February 19, 1884.

Application filed May 18, 1883. (No model.)

*To all whom it may concern:*

Be it known that I, JULIUS G. SMITH, a citizen of the United States, residing at Margaretville, in the county of Delaware and State of New York, have invented certain new and useful Improvements in Milk-Coolers, of which the following is a specification.

My invention relates to an apparatus for cooling milk and separating the cream therefrom; and it has for its objects the peculiar means for subjecting the milk therein contained to the influence or effects of cold water continuously supplied to and withdrawn from the apparatus, or retained therein with a supply of ice; means whereby the temperature of the water shall be most evenly distributed and applied to the body of milk; means for permitting direct access to the milk without undue exposure to the exterior atmosphere.

Other important objects will appear in the following description of my invention, and its operation and its novel features will be specifically set forth in the claims.

Figure 1:
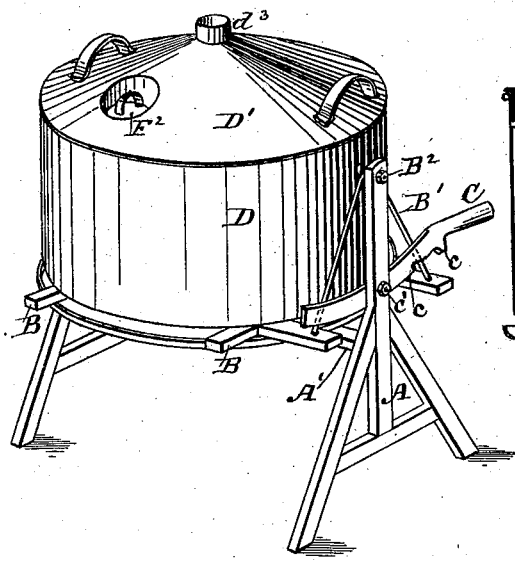
Figure 2:
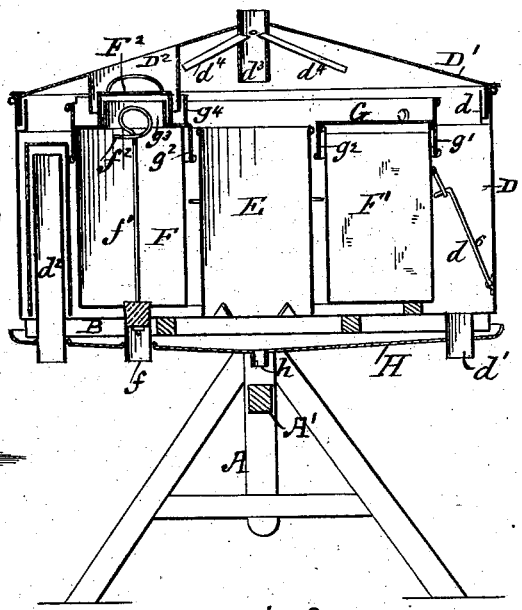
Figure 4:
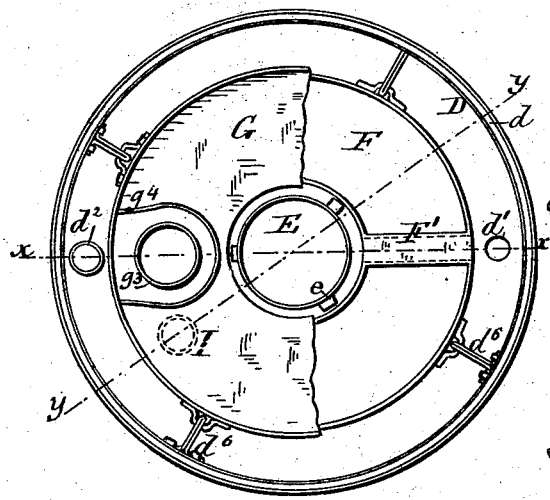
Figure 3:
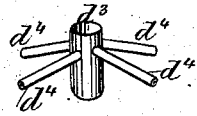

Referring to the accompanying drawings, forming a part hereof, Figure 1 is a perspective view of the apparatus; Fig. 2, a central vertical section on line $x\ x$ of Fig. 4; Fig. 3, a perspective of the water-distributing pipes; Fig. 4, a plan of the milk and water receptacles with portions of the cover of the milk-receptacle removed; and Fig. 5, a section on the line $y\ y$ of Fig. 4, in which latter figure certain modifications are illustrated. Fig. 6 is a perspective view of the milk-receptacle, showing the transverse hollow partition or passage therein and the skimmer-tube. Fig. 7 is a plan view of the under side of the cover for the outer or water receptacle. Fig. 8 is a top view and vertical section of the skimmer-tube, made upon a larger scale than the other figures.

Like letters refer to like parts in all the figures.

Any suitable frame-work may be used to support the apparatus, the main requisite being that it shall be so supported as to be capable of being tilted or inclined from a horizontal position. In this instance I illustrate a frame-work comprising two upright posts, A, having bracing-legs connected by a bar, A'. Within this frame-work is suspended a skeleton platform, B, the means of suspension being in this instance metal rods B', secured at each of their ends to the platform, and each rod bent in the middle of its length to form a loop, which hangs upon a trunnion, $B^2$, projecting from the inner side of the upright A. The platform B projects beyond the posts, so as to strike against the posts or their legs, and thus limit the extent to which it may be swung or tilted.

C represents a latch, pivoted at $c'$ to one of the posts, and provided with notches $c\ c$, which are adapted to embrace the projecting portion of the platform and retain it in a desired horizontal or inclined position. Upon the platform is secured in any suitable manner a main outer water-receptacle, D, provided with a water-seal, $d$, for the cover D' thereof, and with a discharge, $d'$, and a covered overflow, $d^2$. The cover D' has a central water-supply pipe, $d^3$, to which hose may be connected, if desired.

Projecting into the supply-pipe $d^3$ are deflecting-pipes $d^4$, which serve to direct a portion of the incoming water upon the cover of the milk-receptacle and toward the walls of the receptacle D, while the remainder of the water falls directly into a central compartment or ice-chamber, E.

F represents the milk-receptacle, which is arranged concentric with the main or water receptacle and the ice-chamber, being surrounded by the former and almost completely surrounding the latter—that is to say, the milk-receptacle F is a complete annular chamber, except a portion, F', which is constructed to serve as a passage for the water from the central or ice chamber to the annular space between the walls of the chambers or receptacles F and D. The relative sizes of the ice and milk receptacles are such that another annular space occurs between them, as clearly shown, and the relative positions of the receptacles are maintained by the hooks $d^6$, and by projecting wires or plates $e$, secured to the outer surface of the ice-receptacle, to prevent the latter from coming in contact with the walls of the milk-vat and lowering its temperature too much at that point. Beneath the platform is a sweat-receiver or drip-pan, H, having a drain-tube, $h$. This drip-pan is in this instance secured to and supported by the overflow and discharge nozzles; but, if desired, it may be secured to the platform in any suitable manner. The cream may be separated from the milk by letting the latter out through the bottom opening, $f$, until the cream only remains in the vat.

Figure 5:
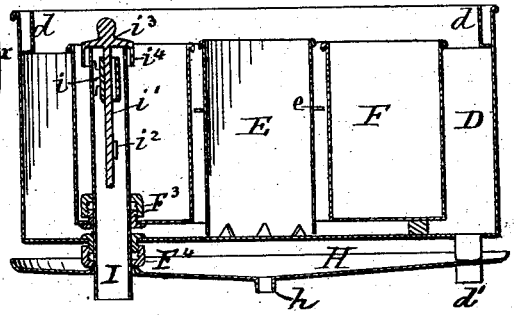

In Figs. 5 and 8 I have illustrated an additional discharge-tube or skimmer, I, capable of being elevated or depressed at will by passing it through stuffing-boxes $F^3$ $F^4$, located in line with each other, and secured to the bottoms of the milk and water receptacles, respectively.

Within the tube I is secured a bracket, $i$, having a key-hole perforation, $i^5$, therein, through which a rod, $i'$, having a lug, $i^2$, passes, and is connected to the cover $i^3$, which cover has a depending flange, $i^4$, which acts as a seal to the tube, and also to detach the cream adhering to said tube, as hereinafter described.

When the cooler is to be filled with milk, the tube I is raised up above the desired milk-level by taking hold of the handle on top of the cover $i^3$, and then pulled upward, taking care that the lug $i^2$ on the rod $i'$ does not register with the slot $i^5$ in the bracket $i$, but comes against the under side of said bracket. When the handle is released, the rod and cover will fall until the latter rests on top of the tube I and seals it. When the cream has formed on the surface of the milk, it may be drawn from said surface by raising the rod $i'$ until the lug $i^2$ thereon has passed up through the slot $i^5$, and then by giving the rod a part of a revolution and pressing it downward the lug $i^2$ will ride on top of the hub of the bracket $i$, and by continuing to press upon the handle of the cover $i^3$ the tube I is pushed downward through the stuffing-boxes until the upper end of said tube has become submerged under the cream, and the latter will run through the tube I.

The operation of the apparatus is as follows: The apparatus being in a horizontal position, water is supplied, (by a hose, if desired, secured to or connected with the pipe $d^3$,) and a portion thereof is diverted into the cover G, and the main portion thereof into the central or ice compartment, E. The outlet $d'$ being closed, the water rises until it passes over the overflow $d^2$, and thence out of the apparatus; and if the supply is continued, as is customary in some instances, the water circulates through the passage F' from the central annular recess or space to the outer one, thus surrounding the milk-receptacle F and keeping at a uniform temperature any milk contained therein. When ice is placed in the receptacle E, it does not come into direct contact with the walls of the milk-receptacle, but first cools the water, which thus gradually conveys the cooling effect of the ice to the milk. Now, it will be seen that the cover D' is water-sealed to the water-vat or main receptacle D, the cover $F^2$ is water-sealed to the milk-receptacle cover G by the peculiar arrangement of the flanges $g^3$ $g^4$, and the aperture through the cover D' is water-sealed to the cover G by the pendent flange $D^2$, entering between the flanges $g^3$ $g^4$, standing upon the cover G, and the cover G itself is water-sealed to the milk-receptacle by its pendent flanges $g'$ $g^2$, which extend below the overflow-line of the pipe $d^2$; hence the cover D' may be bodily removed without the admission of air to the body of milk, and the cover $F^2$ may be removed bodily without admission of air to the water or ice compartments, and by elevating the rod $f'$ milk may be withdrawn from the bottom at $f$ without undue admission of air to the milk-compartment, and such withdrawal may be controlled by suspending the branch $f^2$ of said plug-rod on the flange $g^3$, it being understood that so suspending the plug but partially withdraws it from the outlet, so that such a discharge of the milk is unaccompanied by any rapid whirling or agitation of the cream therein. So, also, by this operation the proper moment to cease the discharge of milk, in order to retain the cream within the compartment F, may be observed through the opening into the said compartment and through that in the cover D'.

It will be observed that, the entire apparatus being suspended, it may at any time be tilted so that the discharge-opening $f$ is substantially the lowest point, and hence all of the cream may be collected immediately at and about the discharge-pipe, as when tilted the cream would gradually move in the receptacle F in both directions from the walls of the passage F' and collect, as described, about the outlet.

It being preferable at times to separate the cream from the milk—that is, remove or skim the cream from the top of the milk—I have illustrated in Figs. 5 and 8 means whereby that operation may be effected. In such case, if the pipe I occupies the position of the tube $f$, the cover $F^2$ is removed; or, if both the tube $f$ and the pipe I are used in the same machine, as shown in Fig. 4, the covers D' and G are arranged and the plug or cover $i^3$ is raised, its flange $i^4$ cutting or separating the edge of the cream (that would otherwise adhere to the pipe I) therefrom as it is raised from the cream, and the tube I is depressed until the cream alone will overflow therein. By slightly tilting the apparatus the more distant portions of the layer of cream flow by gravity toward and into the pipe until all of the cream is separated and drawn off into a suitable receptacle, when by means of the rod $f'$, with its plug and discharge-tube $f$, the milk may be discharged into another receptacle.

Various modifications may be made in the details of construction herein shown and described without departing from the main features of my invention.

Other means for suspending and retaining the apparatus in different inclined positions may be employed, independent and separate seals may be provided for each opening and the cover thereof, a differently constructed and supported sweat-receiver or drip-pan may be employed, and different means may be used to secure the several compartments in relative positions; but such variations I deem as comprehended by my invention.

Having described my invention and its operation, what I claim as new is—

1. A milk-cooling apparatus comprising a central cylindrical ice or water receptacle, a concentric encircling milk-receptacle, and an outer encircling water-receptacle connected to the central ice or water receptacle by a passage radially through the milk-receptacle, substantially as specified.

2. The combination of a main exterior water-receptacle and a circular milk-receptacle having a water-passage radially therethrough, each of the receptacles having an inlet and an outlet, substantially as specified.

3. The combination of the cover $D'$, pipe $d^3$, and divergent pipes $d^4$, having one end projecting within the pipe $d^3$, substantially as shown and described.

4. The combination of the receptacles D and F, the cover $D'$, provided with flange $D^2$, surrounding and depending from an opening therein, with the cover G, having upward flanges $g^3$ $g^4$, and cover $F^2$, substantially as shown and described.

5. The combination of the water-receptacle D, milk-receptacle F, having a radial passage, $F'$, and the central ice-receptacle, E, substantially as described.

6. The combination of the uprights A, pendent bent rods $B'$, platform B, suspended therefrom, water-receptacle D, supported on said platform and containing milk and ice receptacles, with the lever C, provided with notches $c\ c$, substantially as described.

7. In a milk-receptacle having a discharge-opening, the annular cover G, provided with upward flanges $g^3$ and $g^4$, in combination with a plug, and the handle or rod $f'$ thereof, provided with a branch, $f^2$, to rest upon the flange $g^3$, substantially as and for the purpose described.

8. The combination of a water-receptacle, an annular milk-receptacle therein, and an ice-box within the latter, with a drip-pan under the water-receptacle, having openings for the passage of the water and milk discharging pipes, substantially as and for the purpose described.

9. The combination of water and milk receptacles provided with stuffing-boxes, with a pipe, I, passing through the latter, its slotted bracket $i$ and cover $i^3$, having a stem extending through the bracket, and lug $i^2$, substantially as and for the purpose set forth.

In testimony whereof I affix my signature in presence of two witnesses.

JULIUS G. SMITH.

Witnesses:
JAMES F. GRANT,
JAMES W. KITTEL.